United States Patent Office 3,326,625
Patented June 20, 1967

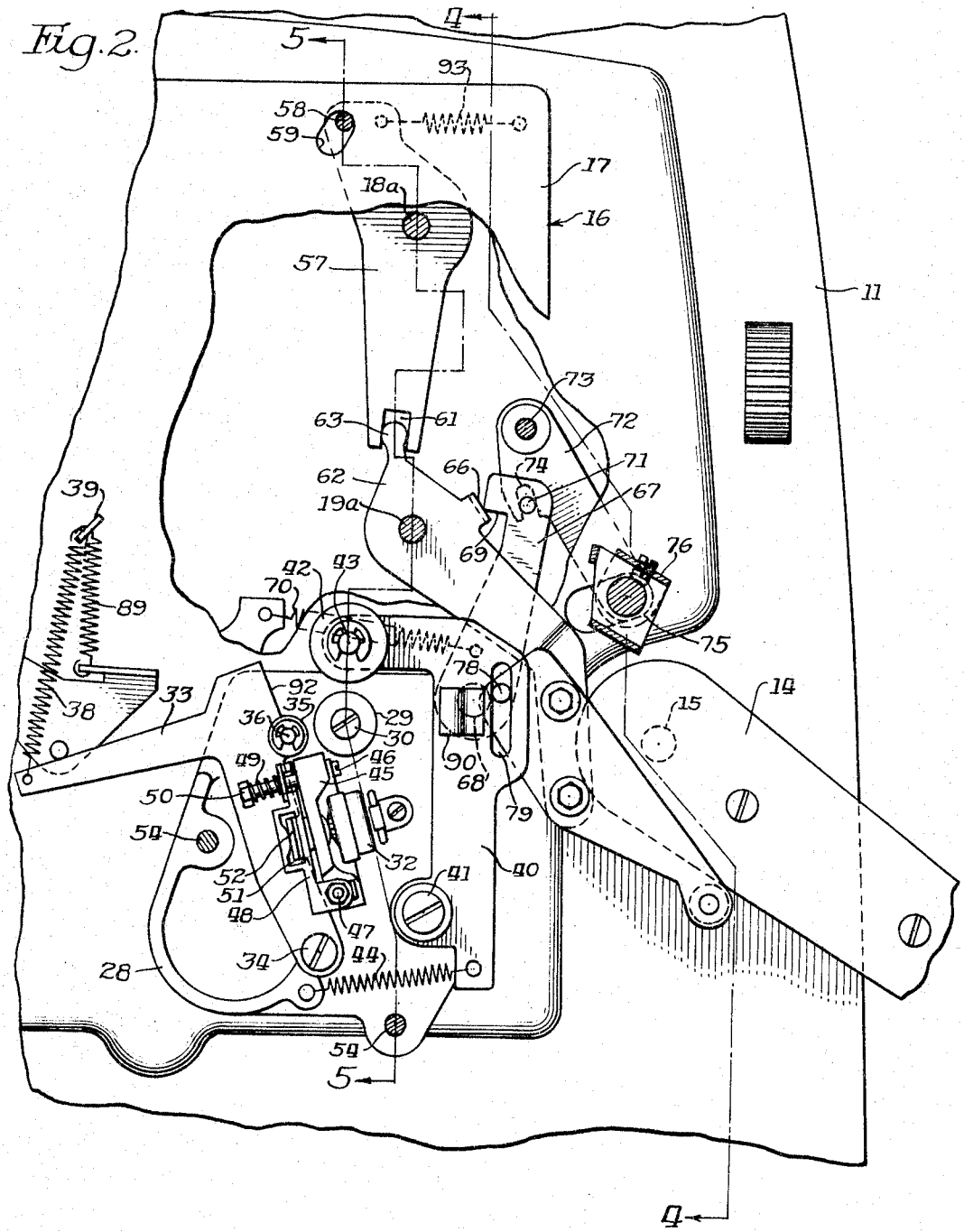

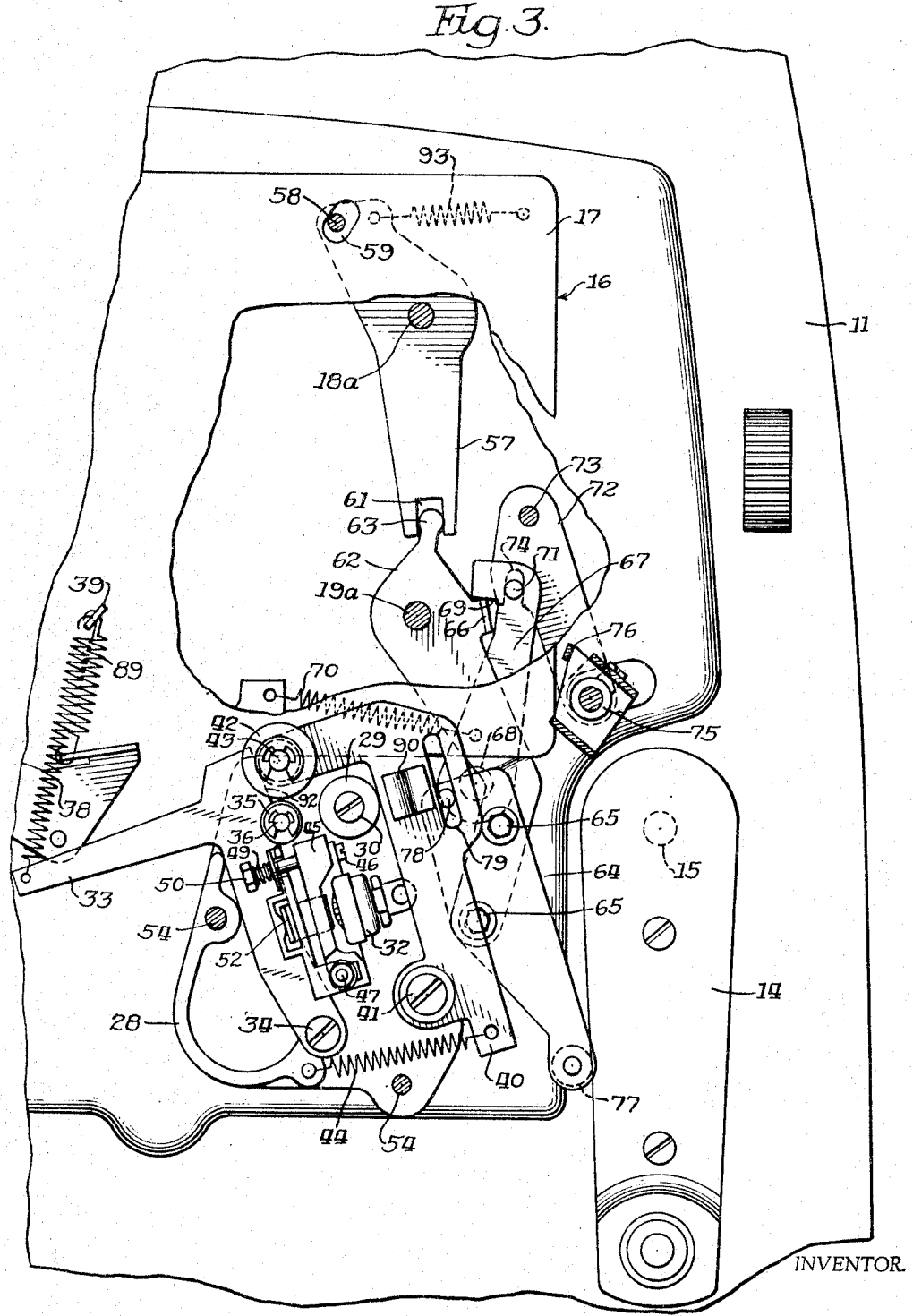

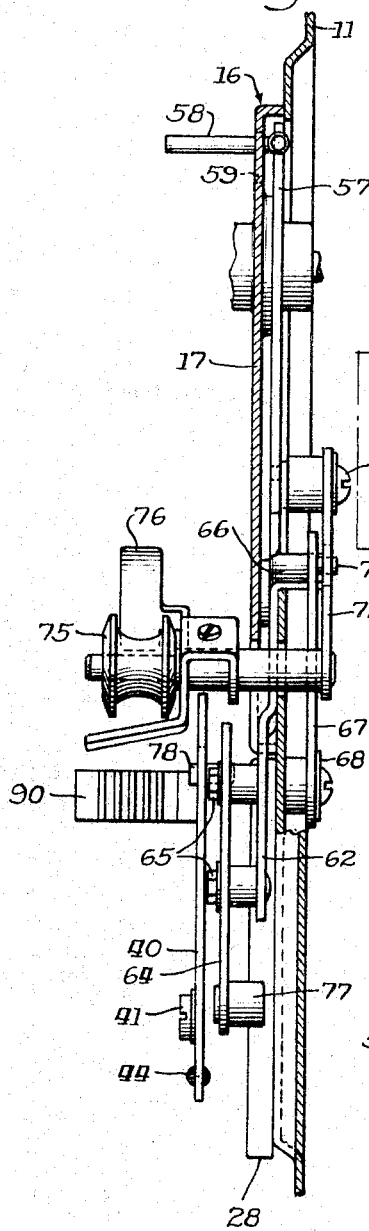
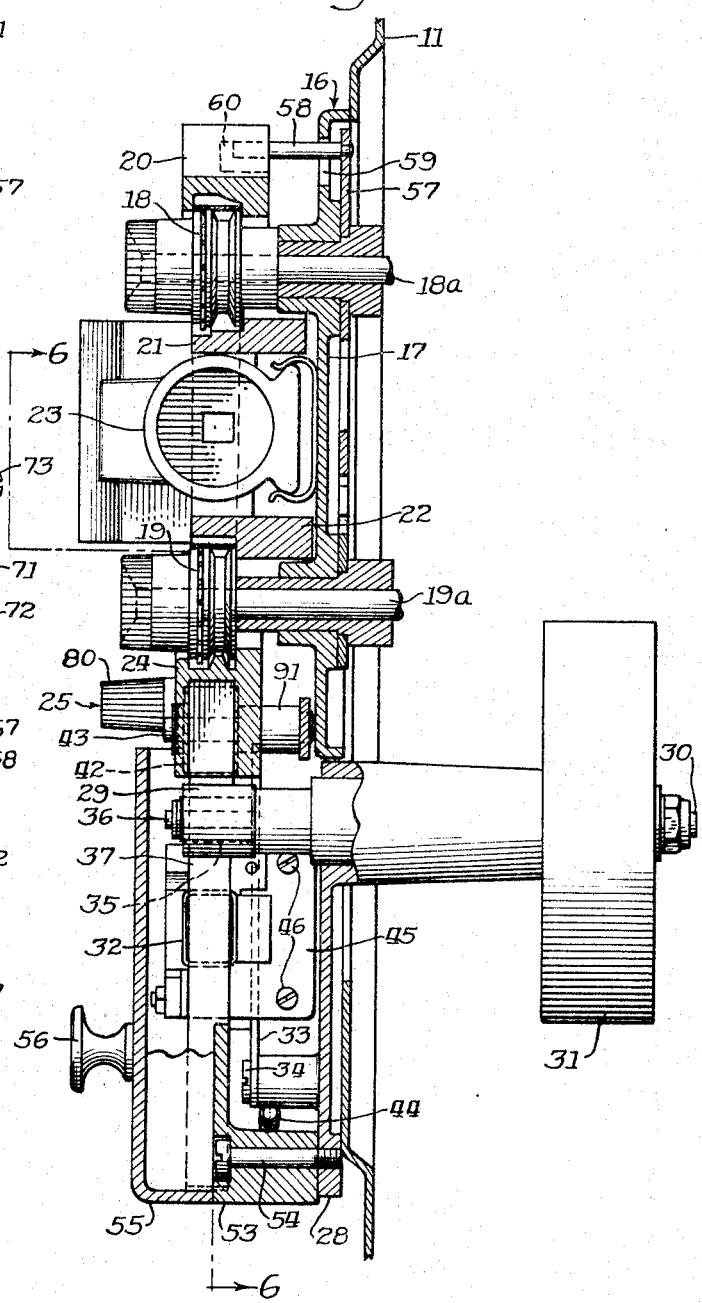

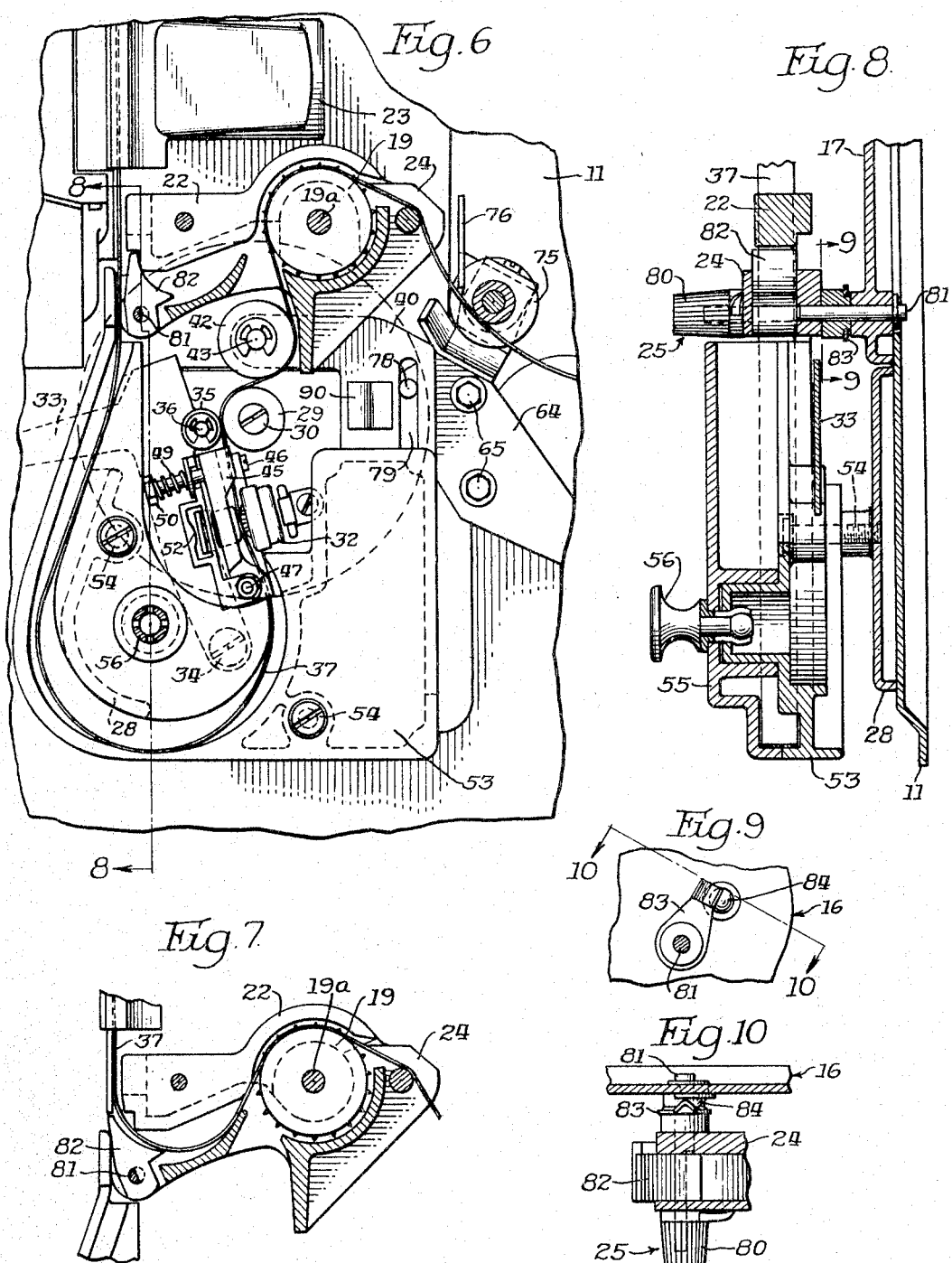

3,326,625
MOTION PICTURE PROJECTOR HAVING SEPARATE THREADING PATHS FOR SOUND AND SILENT FILMS
Jaroslav Cherniavskyj, Skokie, Ill., assignor to Bell & Howell Company, Chicago, Ill., a corporation of Illinois
Filed Sept. 3, 1964, Ser. No. 394,129
16 Claims. (Cl. 352—27)

This invention relates generally to strip film apparatus and more particularly to a motion picture projector which is capable of projecting motion picture film either with or without an accompanying sound track.

In present day motion picture projectors having the capability of magnetically recording and/or reproducing sound it is necessary that both sound and silent films traverse the same path through the projector. This means that all projected film passes through the sound mechanism. This result is unnecessary wear of the film and sound mechanism including the magnetic head when silent film is being projected. As an answer to this problem the present invention is directed to a projector having two film paths, one for sound film, and the other, not passing through any part of the sound mechanism, for silent film.

It is an object of this invention to provide a motion picture projector which provides for automatic threading of a film with an accompanying sound track through the projection mechanism and the sound recording and/or reproducing mechanism onto a take-up reel.

It is another object of this invention to provide a motion picture projector which provides for automatic threading of a silent film through a projection mechanism and onto a take-up reel without going past the sound recording and/or reproducing mechanism.

Still another object of the invention is to provide a motion picture projector with a selector for selecting either of two paths through the projector dependent upon whether the film to be projected either has or has not an accompanying sound track.

Yet another object of the invention is to provide a motion picture projector having a rotatable take-up arm which upon being rotated to its storage position restores the projector to automatic film threading position so that upon next usage of the projector it is immediately ready for reception of a film, and so that any resilient rollers and pads are removed from contact with stationary parts to eliminate flat spots and permanent deformation of these rollers and pads.

A still further object of the invention is to provide a motion picture projector in which reversing of the machine releases the film in certain areas of the sound recording and/or reproducing portion of the machine to provide for proper reverse projection of the film.

Another object of the invention is to provide a motion picture projector with a release roller which releases all portions of the self-threading mechanism in both the projection and sound portions of the machine to a normal operating position with operation of such roller under control of film tension after it has been threaded to the take-up reel.

Other objects, advantages, and features will become apparent from the following description when read in connection with the accompanying drawings in which:

FIG. 2 is a view similar to FIG. 1 with certain parts removed and broken away to more clearly illustrate the invention;

FIG. 3 is a view similar to FIG. 2 showing parts in another functional position;

FIG. 4 is a cross sectional view taken on the line 4—4 of FIG. 2;

FIG. 5 is a cross sectional view taken on the line 5—5 of FIG. 2;

FIG. 6 is a front elevational and cross sectional view taken on the line 6—6 of FIG. 5;

FIG. 7 is a view similar to FIG. 6 showing parts in another functional position;

FIG. 8 is a cross sectional view taken on the line 8—8 of FIG. 6;

FIG. 9 is a cross sectional view taken on the line 9—9 of FIG. 8; and,

FIG. 10 is a horizontal elevational and cross sectional view of the film path selector mechanism taken on line 10—10 of FIG. 9.

Figure 1:
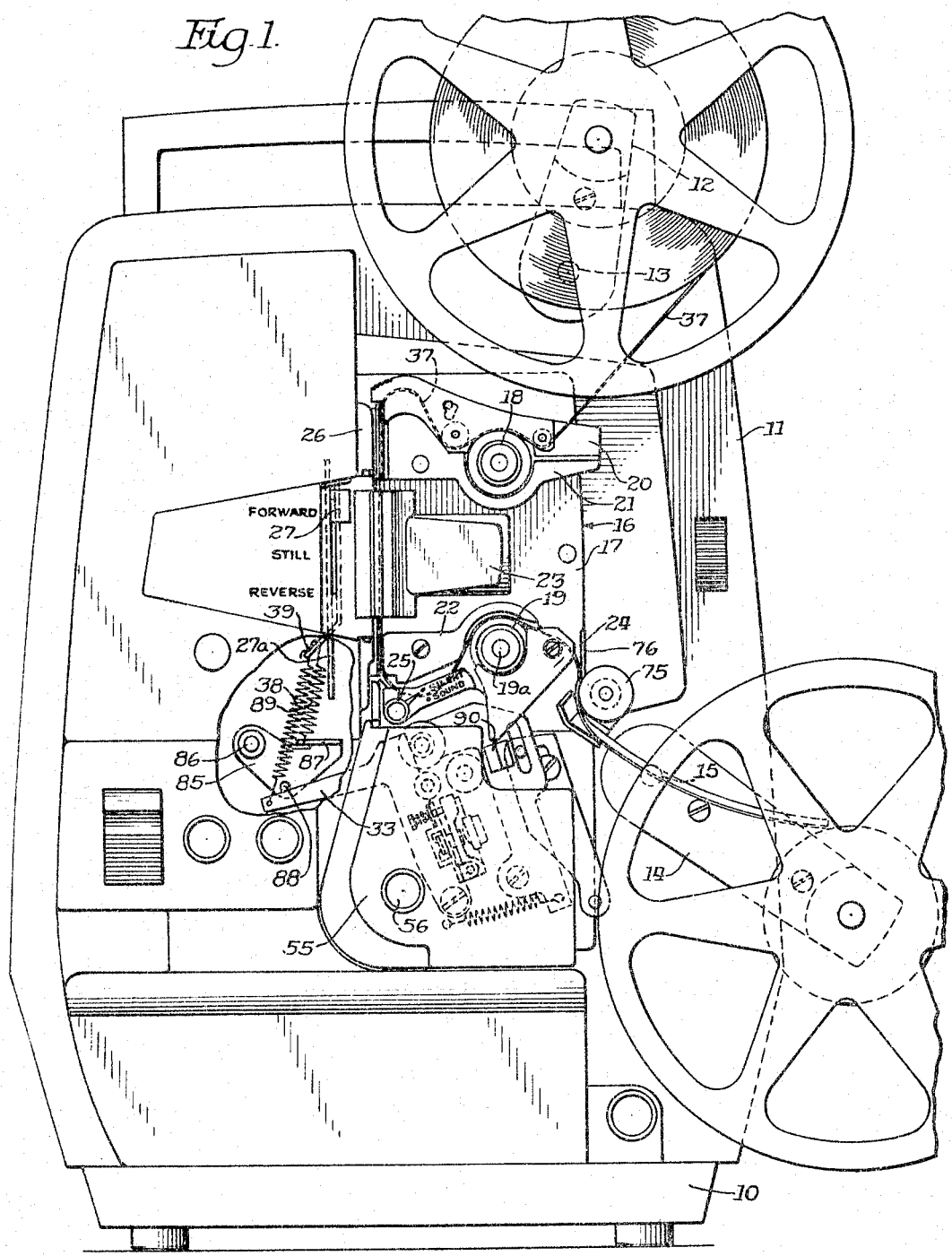
FIG. 1 is a front elevational view of a motion picture film projector showing the invention incorporated therein.

The improved projector comprises a base member 10 and perpendicular and affixed thereto a plate member 11, both members serving to mount all of the projector mechanism. At the upper end of plate 11 a feed reel spindle arm 12 is pivotally mounted on pivot 13. At the lower end of plate 11, a take-up reel spindle arm 14 is pivotally mounted on pivot 15. Each of the arms 12 and 14 can be pivoted to a storage position within the periphery of plate 11 so that a cover (not shown) can enclose the projector mechanism when not in use.

Between the reel arms 12 and 14 there is an L-shaped casting indicated generally at 16. A longer leg 17 of the casting serves as a mounting for an upper film feed sprocket 18, a lower take-up film sprocket 19, an upper movable threading and loop forming member 20, a fixed threading member 21, lower fixed loop forming and guiding members 22 and 24 and a film path deflector mechanism indicated generally at 25. A shorter leg 26 of the L-shaped casting 16 serves as a mounting for a forward, still and reverse picture control lever 27. This portion of the casting also carries a combination hinged gate and lens supporting member 23.

Immediately below leg 17 of casting 16 and mounted to plate 11 is a casting 28 which serves as a mounting for most of the sound recording and/or reproducing portions of the projector. Such mechanism comprises a drum or capstan 29 pivoted on a shaft 30 at the other end of which is attached a fly-wheel 31. The fly wheel is driven by the film and serves to maintain uniform linear movement of the film as it passes a combination magnetic erase recording and/or reproducing head 32.

An L-shaped lever 33 pivoted at 34 on casting 28 carries a friction surfaced pressure roller 35 rotatably mounted on a pin 36. Pressure roller 35 is spring urged toward the drum or capstan 29 to frictionally press a film 37 (FIG. 6) into contact with the drum or capstan 29. Such spring urging is obtained by a tension spring 38 attached at one end to the lever 33 and at its other end to an ear 39.

Another L-shaped lever 40 is pivoted at 41 on casting 28 and carries at its other end roller 42 rotatable on pivot 43. Lever 40 and roller 42 are normally spring urged by spring 44 in a clockwise direction to wrap the film 37 around part of the periphery of drum or capstan 29 (FIG. 6).

The magnetic head 32 is mounted on a block member 45 (FIG. 2) which in turn is mounted to casting 28 by screws 46. Pivoted at the lower end of block member 45 about pivot 47 is a spring urged pressure pad member 48 which normally urges the film against magnetic head 32. Such spring urging is obtained by compression spring 49 surrounding bolt 50 which is screwed into block member 45. The pressure pad member 48 has an opening 51 into which extends an ear 52 bent up from lever 33 so that upon operation of the lever 33 in a counterclockwise direction, the pressure pad member 48 will be cleared of the face of magnetic head 32 for self-threading and reverse operation.

A film channel is provided for directing the film 37 to the sound portions of the projector and comprises a back member 53 (FIG. 6) affixed to casting 28 by means of screws 54 and a front cover member 55 (FIG. 8) mounted to member 53 by a snap latch 56. Each of the members 53 and 55 include coacting film guiding portions.

Mounted for pivotal movement about the upper film feed sprocket axis 18a is a lever 57 (FIG. 2) which at one end has a pin 58 affixed thereto. This pin extends forwardly from lever 57 through a clearance slot 59 in casting 16 into a recess 60 (FIG. 5) in the rear of the upper movable threading and loop forming member 20. At its opposite end, lever 57 has a forked opening 61 which serves as part of an interconnection with another member 62 mounted for pivotal movement about the lower film take-up sprocket axis 19a. Lever 62 at one end has a substantially circular configuration 63 which fits the forked end 61 to form the interconnection between levers 57 and 62. At its other end, lever 62 is bolted to an arm 64 (FIG. 3) by bolts 65 while intermediate its ends there is a bent up ear 66 which forms part of a latching mechanism. A latch lever 67, pivoted at 68 and having a latch hook 69 forms the other part of the latch mechanism. The latch lever 67 is biased to its latched position by spring 70.

Adjacent to the latch hook 69 is a pin 71 affixed to latch lever 67 and projecting rearwardly from the lever as viewed in FIGS. 2 and 3. A lever 72 pivoted at 73 has a forked type slot 74 which engages the pin 71 to form an interconnection between levers 67 and 72. At its extreme end, lever 72 has mounted to it a roller 75 with a co-operating film guide structure 76.

Arm 64 has affixed to its lower end a stud 77 which projects rearwardly as viewed in FIGS. 2, 3 and 4. At its opposite end, the arm 64 has a pin 78 affixed thereto which projects forwardly into an elongated slot 79 formed in L-shaped lever 40.

The deflector mechanism 25 (FIGS. 1 and 10) which directs the film selectively to the upper silent threading path or lower sound threading path comprises a knob 80 affixed to a shaft 81 rotatably mounted in lower fixed loop former 22 and casting 16. Confined between the side flanges of the lower fixed loop former 22, a deflector member 82 is affixed to the shaft 81. Between lower fixed loop former 22 and casting 16 there is a spring detent member 83 (FIG. 9) also affixed to shaft 81 which co-operates with a conical shaped button 84 affixed to the wall of casting 16 to hold the deflector member 82 in either of its two selected positions.

A lever 85 (FIG. 1) pivoted at 86 has a bent up ear 87 and a pin 88 affixed thereto. The bent up flange 87 is directly in line with an extension 27a of picture control lever 27 and is biased toward lever 27 by spring 89. Operation of picture control lever 27 to the "Reverse" position will move the lever 33 and cause the pressure roller 35 and pressure pad 48 (FIG. 2) to be released from engagement with the film when one desires to operate the projector in reverse. Movement of the lever 27 to "Still" position will cause the lever 33 to be moved only enough to disengage pressure roller 35.

As previously mentioned, both upper reel arm 12 and lower reel arm 14 are pivoted to a storage position within the confines of plate 11 so that a protective cover can be placed over the mechanism when the projector is not in use. This pivoting of the lower reel arm 14 to its storage position will restore all of the self-threading members of the projector to a self-threading position which means that for the projection of the next film, the projector is ready for immediate use. Such restoration is effected by the side of reel arm 14 (FIG. 3) contacting stud 77 to pivot arm 64 and lever 62 fastened thereto about the lower take-up sprocket axis 19a. This rotation also causes bent up ear 66 to rotate beneath latch hook 69 which is urged into latching position by tension spring 70. Rotation of lever 62 causes lever 40 to move counter clockwise through the pin and slot connection between the lever 40 and member 64. As lever 40 moves, an enlarged portion 91 (FIG. 5) located immediately behind roller 42 will engage surface 92 of lever 33. (FIG. 3.) Movement of lever 33 will then cause a separation of pressure roller 35 from drum or capstan 29 as well as separation of the pressure pad member 48 from the operating face of magnetic head 32. This now places the projector in readiness for reception of the film 37 as all of the automatic threading members are in self-threading position.

To thread the projector for a sound film, the film is inserted between the upper movable threading member 20 and upper fixed threading member 21 from where it passes over film feed sprocket 18 and through additional loop forming portions of the upper threading members. The film then goes through the projection gate, downwardly through the film channel formed by members 53 and 55, upwardly between the magnetic head 32 and the pressure pad member 48, between pressure roller 35 and drum or capstan 29, to the right of roller 42, through the lower fixed threading members 22 and 24, around lower film take-up sprocket 19, through film guide 76 under roller 75 and then to a tooth-type take-up reel mounted on the take-up spindle. The take-up spindle is driven through a torque clutch at a rotational speed in excess of the linear speed of the film as it passes through the projector. This causes tension on the film which now rotates lever 72 on its pivot 73 in a counter clockwise direction by upward pressure on roller 75 attached to the end of lever 72. Such movement of lever 72 will cause forked slot 74, through pin 71, to move latching lever 67 clockwise until latch hook 69 clears the bent up ear 66 on lever 62. Lever 62 is now free to rotate under the biasing of tension spring 93 in a counter-clockwise direction. Through the interconnection of configuration 63 and forked slot 61 lever 57 will be rotated in a clockwise direction, and, by means of pin 58 and co-operating recess 60 move upper movable self-threading member 20 from its self-threading to its nonthreading position.

The interconnection between member 64 and lever 40 comprising pin 78 and slot 79 also will cause lever 40 and roller 42 to move to the position shown in FIGS. 2 and 6. This movement will cause the film 37 to wrap about drum or capstan 29. Movement of the lever 40 also moves enlarged portion 91 behind roll 42 out of contact with surface 92 on lever 33 and thus permits lever 33, under the influence of tension spring 38, to rotate on its pivot 34 in a clockwise direction so that pressure roller 35 will press the film 37 against the drum or capstan 29 and permit contact of the pressure pad member 48 with the film 37 to assure its being in intimate contact with the operating face of magnetic head 32. The projector is now in a normal operating condition for the projection of motion pictures and the magnetic recording and/or reproduction of accompanying sound.

For subsequent reels of film, manually operated lever 90 is moved to the left (FIGS. 1 and 3) to restore all self-threading members to their self-threading position.

In the event that projection of motion picture film without accompanying sound is desired, it is only necessary to turn the film path deflector knob 80 to the "Silent" position as shown in FIG. 1. This will place deflector 82 in the position shown in FIG. 7, thus blocking the film 37 from entering the lower film channel. At the same time, deflector 82 guides the film 37 between lower fixed loop formers 22 and 24 directly to the lower film take-up sprocket 19 and on toward the take-up reel as shown in FIG. 1.

It will be understood that modifications and variations may be effected without departing from the scope of the novel concepts of the present invention.

I claim as my invention:

1. A sound motion picture projector comprising:
   a film channel to guide film for projection, and having an outgoing side for directing the film beyond a projection area;
   a sound film threading path and a silent film threading path for alternatively accepting said film from said outgoing side of said channel,
   said paths terminating in a common film guiding channel; and
   a pivotable deflector at the juncture of said outgoing side of said film channel and said film threading paths, said deflector being selectively operable to alternatively guide the film into said sound film threading path and to guide the film into said silent film threading path to bypass said sound film threading path.

2. A projector as in claim 1 including means holding said deflector in a selected position of adjustment wherein said film is guided to one of said film threading paths.

3. A projector as in claim 1 wherein a knob is provided to enable manual movement of said deflector to guide the film into said threading paths.

4. A projector as in claim 1 including a lower loop former having a film take-up sprocket in association therewith, and wherein both said film paths are arranged to direct said film into operative association with said lower loop former and said sprocket.

5. In a sound motion picture projector,
   a frame,
   a feed reel at the upper end of said frame,
   a take-up reel at the lower end of said frame,
   an upper loop former disposed beneath said feed reel and in operative association therewith,
   a film feed sprocket in association with said upper loop former,
   a lower loop former disposed beneath said upper loop former,
   a film take-up sprocket in association with said lower loop former,
   a vertically extending film channel between said loop formers having parallel spaced walls,
   a sound film threading path disposed beneath said lower loop former and including a magnetic reproducing head,
   a pressure pad biased to press the film to said reproducing head,
   a capstan on the outgoing side of said reproducing head,
   a pressure roller pressing the film to said capstan,
   a tension idler biased to wrap the film about said capstan,
   means guiding the film from said tension idler to said film take-up sprocket, and
   deflector means pivotally mounted at the outgoing side of said film channel and selectively positionable to guide the film to pass to said film take-up sprocket between said magnetic reproducing head and pressure pad, said pressure roller and capstan and partially about said tension idler, to accommodate the reproduction of images and sound on the film and positionable in a second position to guide the film to bypass said sound film threading path and magnetic reproducing head and pass directly from said film channel to said film take-up sprocket to accommodate the reproduction of images on the film only.

6. A sound motion picture projector in accordance with claim 5 in which the deflector has two faces, one face of which extends at an angle with respect to each other, wherein one face is positionable to form a downward continuation of one wall of said film channel when the deflector is pivoted in one direction and an opposite face is manually positionable to form a downward continuation of the opposite wall of said film channel to guide the film to bypass said sound film path when the deflector is pivoted in the opposite direction, wherein a means is provided to selectively position said deflector in its two positions and other means are provided to hold said deflector in a selected position of adjustment.

7. In a motion picture projector,
   a frame structure including a base having a support projecting vertically therefrom,
   upper and lower loop formers mounted on said support,
   a film feed sprocket in association with said upper loop former,
   a film take-up sprocket in association with said lower loop former,
   a film guide channel between said loop formers,
   a magnetic reproducing head and pressure pad mounted on said support to receive a film therebetween,
   means guiding the film from said magnetic head to said take-up sprocket and maintaining tension thereon,
   a cover mounted on said support and extending over said reproducing head and pressure pad, said cover having a looped guide channel therein opening toward said support and in film receiving relation with respect to said film guide channel and providing a sound film threading path guiding the film from said upper loop former to pass between said magnetic reproducing head and pressure pad to enable the projection of images and sound on the film, and a manually positionable deflector member pivotally mounted on said support at the entering end of said looped guide channel to guide the film to pass along said looped guide channel and sound film threading path and to guide the film to bypass said looped guide channel and pass directly to said take-up sprocket.

8. In an automatic threading motion picture projector having a film supply, and a take-up reel support arm movable between a projected position and a storage position, said support arm being adapted to support a reel about which film from said supply is wound;
   a film path connecting said supply and the reel;
   an upper loop former defining a portion of said film path and being movable between threading and project conditions;
   a lower loop former defining another portion of the said film path and being movable between threading and projecting conditions; and
   means conditioning said loop formers for film threading when said support arm is moved from said projected position to said storage position.

9. A projector as in claim 8 including a sound portion having a magnetic reproducing head means and a pressure pad means relatively movable into and out of substantial engagement, one of said means being biasingly urged into said substantial engagement with said other means when said reel support arm is in project condition and being mounted for movement away from said other means when said reel support arm is moved into storage position.

10. In an automatic motion picture projector,
   a base,
   a support plate projecting upwardly of said base,
   a feed reel spindle arm pivotally mounted on said support plate,
   a feed reel rotatably mounted on said arm,
   a take-up reel spindle arm pivotally mounted on said plate beneath said feed reel spindle arm,
   a take-up reel rotatably mounted on said arm,
   said arms being movable inwardly along said plate into storage positions,
   an upper loop former movably mounted on said plate beneath said spindle,
   a take-up sprocket in association with said movable upper loop former,
   a lower loop former mounted on said plate,
   a film take-up sprocket in association with said lower loop former, a film channel between said loop formers for guiding the film for projection, a magnetic reproducing head mounted beneath said lower loop former and take-up sprocket, a lever arm pivotally mounted on said plate, a pressure pad movably mounted on said plate, spring means biasing said pressure pad to engage said magnetic reproducing head, a connection between said lever arm and pressure pad for withdrawing said pressure pad from said reproducing head to accommodate the self-threading of a film therebetween, spring means connected with said lever arm and biasing said lever arm toward said reproducer head, a restoring lever pivotally mounted on said plate adjacent said take-up spindle arm and pivoted by said take-up spindle arm upon movement of said arm into a storage position, and an operative connection between said restoring lever and said first mentioned lever arm moving said lever arm in a direction to separate said pressure pad from said reproducing head upon movement of said take-up reel spindle into a storage position, to thereby restore the machine in condition for self-threading.

11. A self-threading motion picture projector in accordance with claim 10 wherein a capstan is rotatably mounted on said plate on the outgoing side of said reproducing head and pressure pad and on the incoming side of said take-up sprocket, wherein a pressure roller is rotatably mounted on said first mentioned lever arm for yieldable engagement with said capstan, and wherein the operative connection between said restoring lever and said lever arm separates said pressure pad from said reproducing head and said pressure roller from said capstan by movement of said take-up reel spindle arm into a stored position.

12. A self-threading motion picture projector in accordance with claim 11 in which a tension lever arm is pivotally mounted on the plate beneath the pivot of the restoring lever and has a tension idler thereon on the outgoing side of the capstan and the incoming side of the take-up sprocket, wherein a spring biases the tension lever arm and idler in a direction to wrap the film about the capstan, and wherein an engaging connection is provided between the restoring arm and an engaging connection is provided between the tension lever arm and the first mentioned lever, and wherein said engaging connections effect movement of said tension idler into a self-threading position, disengagement of said pressure roller from said capstan and disengagement of the pressure pad from said reproducing head upon movement of the take-up spindle arm to a storage position.

13. In a self-threading motion picture projector, a base, a support plate projecting upwardly of said base, a feed reel spindle arm pivotally mounted on said plate, a feed reel rotatably mounted on said arm, a take-up reel spindle arm pivotally mounted on said plate beneath said feed reel spindle arm, a take-up reel rotatably mounted on said arm, said arms being movable inwardly along said plate into storage positions, an upper loop former pivotally mounted on said plate, a feed sprocket in association with said loop former, said upper loop former being movable to a threading position to accommodate the threading of film on said feed sprocket, and to an non-threading position during operation of the machine, a lower loop former mounted on said plate, a film take-up sprocket in association with said lower loop former, a vertical film projection channel between said loop formers, a magnetic reproducing head on said plate beneath said lower loop former, a sound film threading path from said film channel to said magnetic reproducing head, a pressure pad movably mounted on said plate for maintaining pressure on the film passing along said reproducing head, a capstan rotatably mounted on said plate on the outgoing side of said reproducing head and the incoming side of said take-up sprocket, a first lever arm pivotally mounted on said plate for movement toward and from said capstan, a spring biasing said lever arm toward said capstan, a pressure roller on said first lever arm and engaged with said capstan by said spring, an operative connection between said first lever arm and said pressure pad for releasing said pressure pad from said reproducing head upon movement of said first lever arm against its spring bias, a second lever arm pivotally mounted on said plate and having a portion extending towards said first lever arm, a tension idler on said second lever arm, an engaging connection between said second lever arm and said first lever arm, a restoring lever pivotally mounted on said plate in association with said film take-up spindle arm, a lost motion connection between said restoring lever and said second lever for moving said second lever to position said tension idler in self-threading position upon movement of said restoring lever in a restoring direction, effected by movement of said take-up spindle arm into a storage position, a third lever arm pivotally mounted on said plate and having operative connection with said movable loop former for moving said loop former into threading and non-threading positions.

engaging connections between said restoring lever and said third lever arm for moving said third lever arm in a direction to move said upper movable loop former in a threading position upon movement of said restoring lever in a restoring direction, a latch holding said restoring lever in its restoring position and holding said upper loop former, said pressure pad, pressure roller and tension idler in self-threading positions upon movement of said take-up spindle arm out of its storage position, and a release for said latch operated by tension on the film, for releasing said latch and accommodating movement of said upper loop former to a non-self-threading position and said pressure pad, pressure roller and tension idler in operative sound reproducing and projecting positions.

14. A self-threading motion picture projector in accordance with claim 13 wherein a deflector is pivoted on said plate between the vertical film projection channel and the lower loop former and has one face in association with said film channel and said sound film threading path for guiding the film through said sound film threading path when the deflector is pivoted in one direction and has another face movable into operative association with said film channel to switch the film to bypass said sound film threading path and pass directly to said film take-up sprocket when the deflector is pivoted in the reverse direction.

15. In a sound moving picture machine, a base, a support plate extending upwardly of said base, an upper loop former mounted on said support plate, a film feed sprocket in association therewith, a lower loop former mounted on said plate, a film take-up sprocket is association therewith, a vertically extending film feed channel between said loop formers, a sound film threading path in registry with said film feed channel and extending beneath said lower loop former and including a magnetic reproducing head mounted on said plate, a pressure pad movably mounted on said plate and biased to engage said reproducing head, a lever pivotally mounted on said plate and connected with said pressure pad for moving said pressure pad away from said reproducing head against its bias, spring means biasing said lever to accommodate said pressure pad to engage said reproducing head, a capstan rotatably mounted on said plate on the outgoing side of said reproducing head and the incoming side of said film take-up sprocket, a pressure roller rotatably mounted on said lever for engagement with said capstan, a picture control lever disposed above said first mentioned lever and vertically movable into forward, still and reverse positions to effect forward and reverse feed of the film and to hold the film in a still position for the projection of still pictures, and an operative connection between said picture control lever and said first mentioned lever for moving said first mentioned lever against its spring bias to disengage said pressure roller from said capstan when said picture control lever is in its still position and to disengage said pressure pad from said reproducing head and to hold said pressure roller out of engagement with said capstan when said picture control lever is in its reverse position.

16. A sound motion picture projector in accordance with claim 15 wherein the operative connection between the picture control lever and the first lever includes a second lever biased to engage said picture control lever and an engaging connection between said second lever and said first lever to move said first lever in a direction to first release said pressure roller from said capstan and to then release said pressure pad from said reproducing head upon movement of said picture control lever into a reverse position.

References Cited

UNITED STATES PATENTS

| | | | |
|---|---|---|---|
| 2,023,065 | 12/1935 | Conrad et al. | 352—29 |
| 2,142,493 | 1/1939 | Carpenter | 352—159 |
| 2,327,776 | 8/1943 | Fairbanks et al. | 352—159 |
| 2,950,646 | 8/1960 | Blank | 352—242 X |
| 3,039,022 | 6/1962 | D'Arcy. | |
| 3,224,828 | 12/1965 | Chytil | 352—27 |
| 3,233,958 | 2/1966 | Kaess et al. | 352—27 X |

JULIA E. COINER, *Primary Examiner.*